(12) United States Patent
Samanta et al.

(10) Patent No.: US 7,963,271 B2
(45) Date of Patent: Jun. 21, 2011

(54) SYSTEM AND METHOD FOR HEATING VISCOUS FUEL SUPPLIED TO DIESEL ENGINES

(75) Inventors: Indraneel Samanta, Bhilai (IN); Shawn Michael Gallagher, Erie, PA (US)

(73) Assignee: General Electric Company, Niskayuna, NY (US)

( * ) Notice: Subject to any disclaimer, the term of this patent is extended or adjusted under 35 U.S.C. 154(b) by 998 days.

(21) Appl. No.: 11/828,384

(22) Filed: Jul. 26, 2007

(65) Prior Publication Data

US 2009/0025908 A1   Jan. 29, 2009

(51) Int. Cl.
F02M 31/02   (2006.01)
(52) U.S. Cl. .................................................. 123/557
(58) Field of Classification Search ........... 123/543–558
See application file for complete search history.

(56) References Cited

U.S. PATENT DOCUMENTS

| | | | |
|---|---|---|---|
| 1,107,967 A | | 8/1914 | Knaak |
| 1,623,074 A | | 4/1927 | Tartrais |
| 3,526,214 A | * | 9/1970 | Kamo ........................... 123/551 |
| 4,300,514 A | * | 11/1981 | Schaich ........................ 123/557 |
| 4,519,358 A | * | 5/1985 | Redele ........................... 123/557 |
| 4,700,047 A | * | 10/1987 | Crossett et al. ............... 219/205 |
| 6,199,542 B1 | | 3/2001 | McKay |
| 2004/0076413 A1 | | 4/2004 | Biess et al. |
| 2008/0092859 A1 | * | 4/2008 | Little ............................ 123/557 |

FOREIGN PATENT DOCUMENTS

EP   1233171 B1   8/2003
JP   04203347 A * 7/1992

OTHER PUBLICATIONS

PCT International Search Report dated Aug. 12, 2008.

* cited by examiner

*Primary Examiner* — M. McMahon
(74) *Attorney, Agent, or Firm* — Marie-Claire Maple

(57) ABSTRACT

A heat transfer system is used for heating a viscous fuel supplied to a diesel engine. The heat transfer system includes a heat exchanger provided at a predetermined location within the heat transfer system. A hot fluid and viscous fuel are circulated in a heat exchanging relationship within the heat exchanger to heat the viscous fuel supplied to the engine from a first temperature to a second temperature.

24 Claims, 6 Drawing Sheets

SYSTEM AND METHOD FOR HEATING VISCOUS FUEL SUPPLIED TO DIESEL ENGINES

BACKGROUND

The invention relates generally to an engine cooling system and, more particularly, to a system and method for heating a viscous fuel supplied to a diesel engine.

Diesel engines are used in a wide variety of applications such as tractors, trucks, generators, passenger vehicles, ships, fuel oil furnaces, or the like. Conventionally in certain applications, bio-diesel has been used as a clean burning alternative fuel produced from a domestic renewable resource. Bio-diesel has similar chemical properties compared to petroleum diesel fuel and may be used in a diesel engine either directly or blended with petroleum diesel fuel in a specific ratio. Bio-diesel fuel has a relatively higher carbon efficiency, i.e., ratio of energy generated to carbon produced by combustion. Additionally, bio-diesel emissions are virtually free of sulfur, aromatics, and particulates. In certain other applications, marine diesel oil is also used as an alternative fuel for diesel engines.

Fuels such as marine diesel oil, and bio-diesel have higher viscosity than petroleum diesel fuel and need to be heated to relatively higher temperatures so as to reduce viscosity and enable proper injection into the diesel cylinder. A separate electrical heater is provided in a cavity that is coupled to a fuel inlet of the engine. The heater is provided to heat the fuel in the cavity. The use of a separate heater consumes more power and hence increases the specific fuel consumption (SFC) of the diesel engine.

An improved system and method for heating a viscous fuel supplied to a diesel engine for simultaneously reducing the viscosity of fuels and also reduce specific fuel consumption of diesel engine using the viscous fuel, is desirable.

BRIEF DESCRIPTION

In accordance with one exemplary embodiment of the invention, a heat transfer system for heating a viscous fuel supplied to a diesel engine is provided. The heat transfer system includes a heat exchanger provided at a predetermined location within the heat transfer system. A hot fluid and viscous fuel are circulated in a heat exchanging relationship within the heat exchanger to heat the viscous fuel supplied to the engine from a first temperature to a second temperature.

In accordance with another exemplary embodiment of the invention, a method for heating a viscous fuel supplied to a diesel engine is provided. The method includes circulating a hot fluid through a heat exchanger provided at a predetermined location within a heat transfer system coupled to the diesel engine. A hot fluid and viscous fuel are circulated in a heat exchanging relationship within the heat exchanger to heat the viscous fuel supplied to the engine from a first temperature to a second temperature.

These and other features, aspects, and advantages of the present invention will become better understood when the following detailed description is read with reference to the accompanying drawings.

DRAWINGS

DETAILED DESCRIPTION

Embodiments of the invention provide a heat transfer system for heating a viscous fuel supplied to an engine, for example, a diesel engine. In the foregoing exemplary embodiments of the invention, an engine cooling system is used as a heat transfer system for heating the viscous fuel supplied to the engine. The heat transfer system includes a heat exchanger provided at a predetermined location. A hot fluid and the viscous fuel are circulated in a heat exchanging relationship within the heat exchanger to heat the viscous fuel supplied to the engine from a lower temperature to a higher temperature. The hot fluid may be a liquid medium such as coolant water, or lubrication oil. In certain exemplary embodiments, the hot fluid may include a gaseous medium such as hot air exiting from a compressor, hot air entering the engine, or the like.

In certain exemplary embodiments, a method for heating a viscous fuel supplied to an engine is disclosed. In accordance with exemplary embodiments of the present technique, existing onboard hot fluids within the engine cooling system are used to heat the viscous fuel, rather than using a separate heater to heat the viscous fuel. Hence the specific fuel consumption of the engine system is enhanced. Moreover, usage of fluids within the engine cooling system for heating the viscous fuel results in reduction of the cooling load on the radiator fan resulting in further improvement of the specific fuel consumption. Exhaust emissions from the engine may also be reduced.

Figure 1:
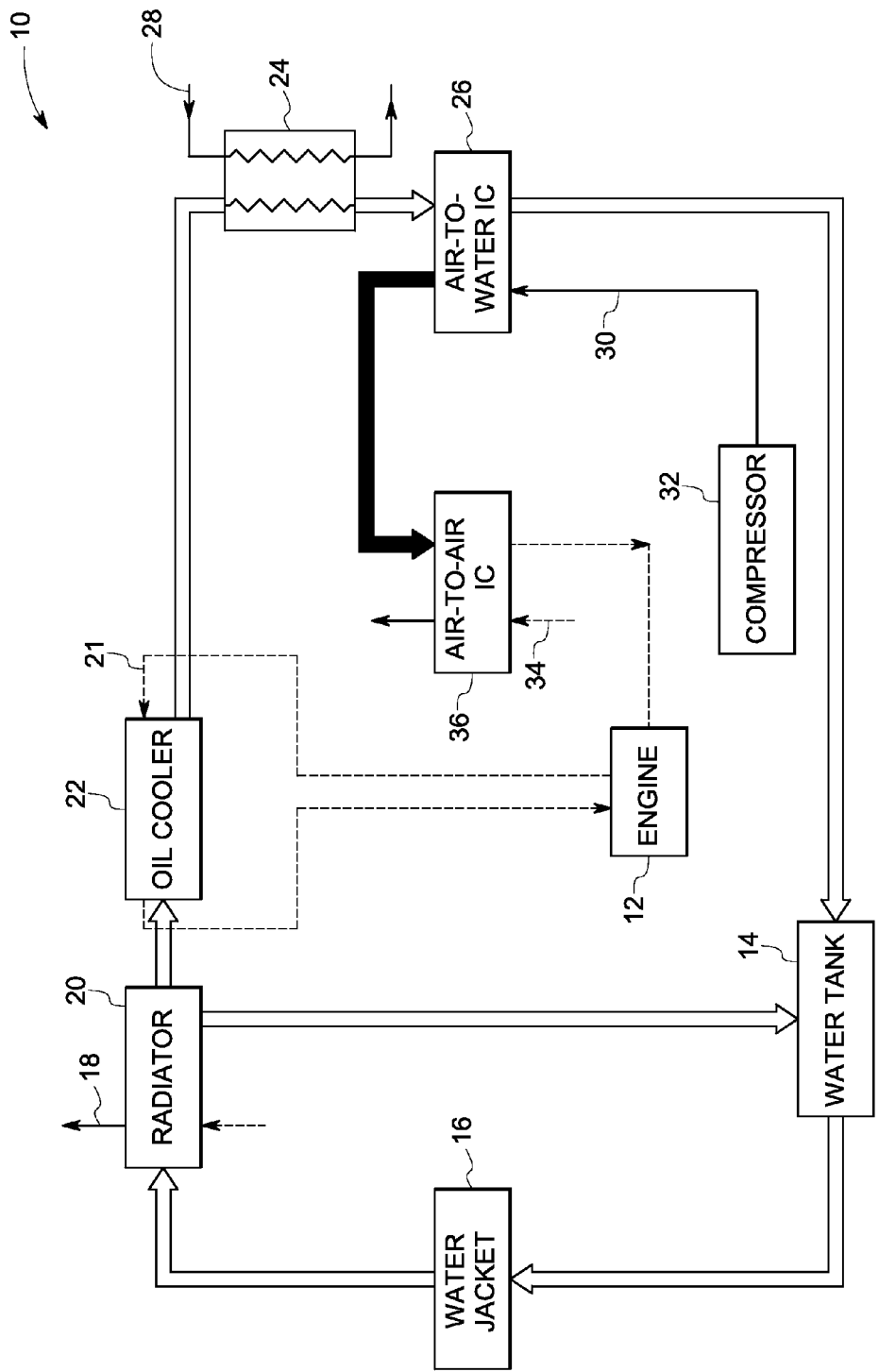
FIG. 1 is a diagrammatical representation of a heat transfer system having a heat exchanger configured for heating a viscous fuel supplied to a diesel engine in accordance with an exemplary embodiment of the invention.

Referring to FIG. 1, an engine cooling system 10 is illustrated in accordance with an exemplary embodiment of the invention. A diesel engine 12 generates heat when the air-fuel mixture is ignited in a combustion chamber of the engine. This ignition causes an engine piston to be forced down inside the engine, levering a connecting rod, and turning a crankshaft, to generate power. In certain applications, temperatures around the combustion chamber may exceed 1000 degree Fahrenheit. To prevent overheating of the engine oil, cylinder walls, pistons, valves, and other components by these extreme temperatures, it is necessary to effectively dispose of the heat. The exemplary engine cooling system 10 is configured to remove excess heat from the engine 12, and to keep the engine 12 operating at an efficient temperature. The engine 12 may include locomotive diesel engines, automotive diesel engines, marine diesel engines, and other stationary engines.

The cooling system 10 includes a water tank 14 configured to store coolant water. The water tank 14 is coupled to a water jacket 16 to supply coolant water to the water jacket 16. The water jacket 16 is disposed surrounding the engine 12. The coolant water in the water jacket absorbs the heat generated by the engine 12. In one exemplary embodiment, coolant water may be heated from 72 degrees celsius to 75 degrees celsius. The heated water from the water jacket 16 is then circulated in a heat exchanging relationship with cool air 18 through a radiator 20. The heat from the water is transferred to the cool air. In one exemplary embodiment, the heated water circulated through the radiator 20 is cooled from 75 degrees celsius to 49 degrees celsius. In one exemplary embodiment, cool air at a temperature of 26 degrees celsius may be circulated through the radiator 20 to cool the heated water. The water from the radiator 20 is circulated in a heat exchanging relationship with hot oil 21 through an oil cooler 22. In the illustrated embodiment, hot oil from the engine 12 is passed through the oil cooler 22. In one embodiment, water passing through the oil cooler 22 is heated from 49 degrees celsius to 62 degrees celsius. Hot oil may be cooled from 76 degrees celsius to 67 degrees celsius via the oil cooler 22. The cooled oil is supplied to the engine 12.

In the illustrated embodiment, a heat exchanger 24 is coupled between the oil cooler 22 and an air-to-water intercooler 26. The hot water exiting from the oil cooler 22 is circulated in a heat exchanging relationship with a viscous fuel 28 through the heat exchanger 24. The water passing through the heat exchanger 24 is used to heat the viscous fuel 28 being supplied to the engine 12 to reduce the viscosity of fuel 28 supplied to the engine 12. The viscous fuel 28 may include palm oil, marine diesel oil, or the like. It should be noted herein that other viscous fuels known in the art may also be envisaged. The viscous fuel 28 may have a higher viscosity than diesel and need to be heated to higher temperatures in order to reduce the viscosity and thereby enable proper injection of fuel into the engine. The use of existing onboard fluid, i.e., hot water exiting the oil cooler 22, for heating the viscous fuel would eliminate the need of a separate heater and also enhance a fuel consumption benefit.

The water exiting the heat exchanger 24 is then passed in a heat exchanging relation with compressed air 30 through the air to-water intercooler 26. A compressor 32 generates the compressed air 30. In one example, the compressed air passing through the air to-water intercooler 26 may be cooled from 199 degrees celsius to 88 degrees celsius. The water passing through the air to-water intercooler 26 is heated by the compressed air 30 and is then fed to the water tank 14. The air exiting the air to-water intercooler 26 is then passed in a heat exchanging relationship with cool air 34 through an air-to-air intercooler 36. In one example, air passing through the air-to-air intercooler 36 is further cooled from 88 degrees celsius to 49 degrees celsius. Air from the air-to-air intercooler 36 is fed to the engine 12. In one example, the cool air passing through the air-to-air intercooler 36 is heated from 26 degrees celsius to 68 degrees celsius. It should be noted herein that the temperatures values disclosed in the illustrated and subsequent embodiments are exemplary values and should not be construed in any way as limiting values. The values may vary depending on the application.

Figure 2:
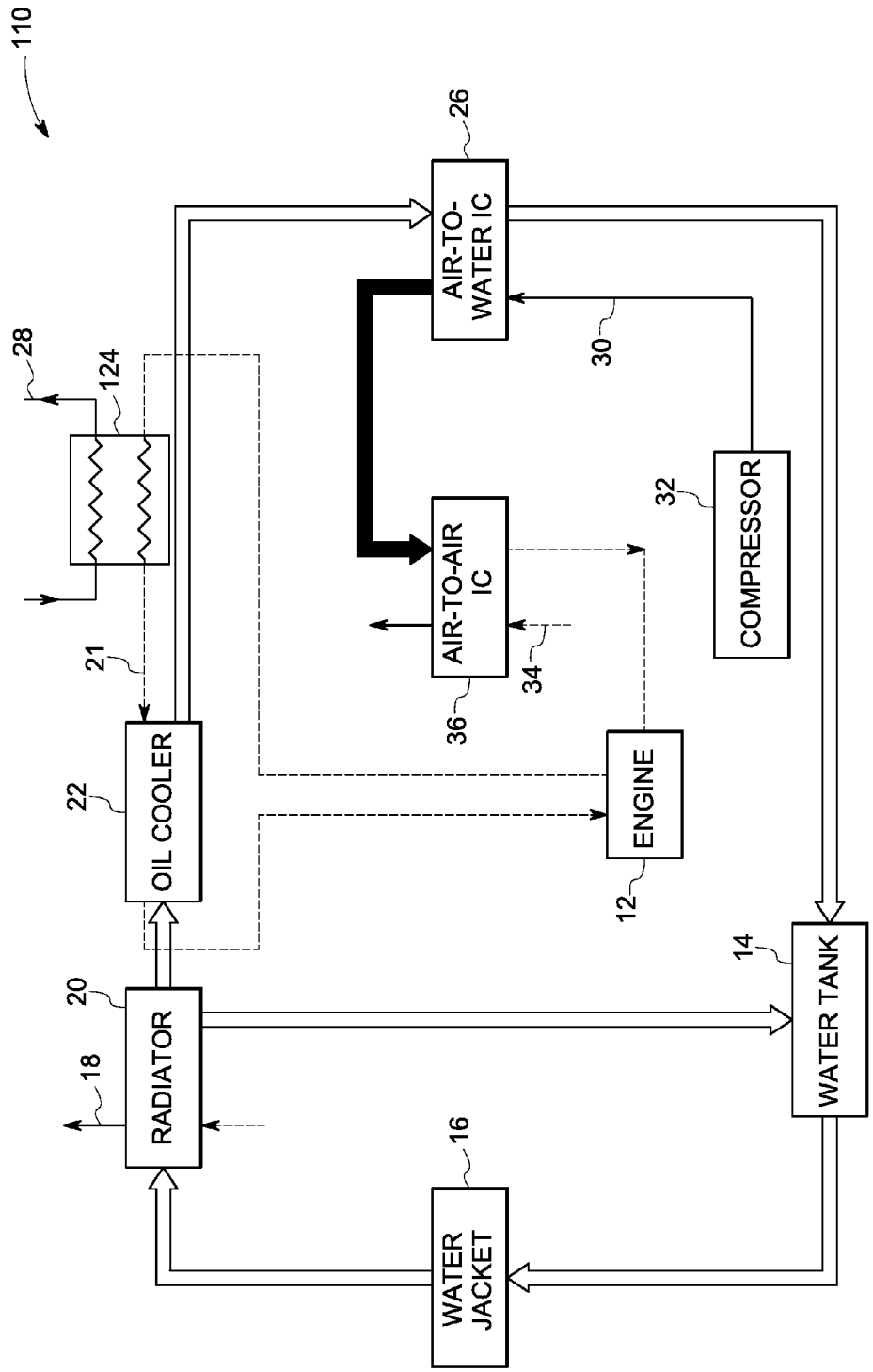
FIG. 2 is a diagrammatical representation of a heat transfer system having a heat exchanger configured for heating a viscous fuel supplied to a diesel engine in accordance with another exemplary embodiment of the invention.

Referring to FIG. 2, an engine cooling system 110 is illustrated in accordance with another exemplary embodiment of the invention. The cooling system 110 includes the water tank 14 configured to store coolant water. The water tank 14 is coupled to the water jacket 16 to supply coolant water to the water jacket 16. The water jacket 16 is disposed surrounding the engine 12. The heated water from the water jacket 16 is then circulated in a heat exchanging relationship with cool air 18 through the radiator 20. The heat from the water is transferred to the cool air 18. The water from the radiator 20 is circulated in a heat exchanging relationship with hot oil 21 through the oil cooler 22.

In the illustrated embodiment, a heat exchanger 124 is coupled to the oil cooler 22. Hot oil 21 from the engine 12 is passed in a heat exchanging relationship with the viscous fuel 28 through the heat exchanger 124. The hot oil 21 passing through the heat exchanger 124 is used to heat the viscous fuel 28 being supplied to the engine 12 to reduce the viscosity of fuel 28 supplied to the engine 12. The lubricant oil exiting the heat exchanger 124 is then fed to the oil cooler 22. The cooled oil from the oil cooler 22 is supplied to the engine 12. The use of existing onboard fluid, i.e., hot oil supplied to the oil cooler 22, for heating the viscous fuel would eliminate the need of separate heater and also enhance a fuel consumption benefit. The water exiting the oil cooler 22 is then passed in heat exchanging relation with compressed air 30 through the air to-water intercooler 26. The remaining cycle of the engine cooling system is similar to the system disclosed in the previous embodiment.

Figure 3:
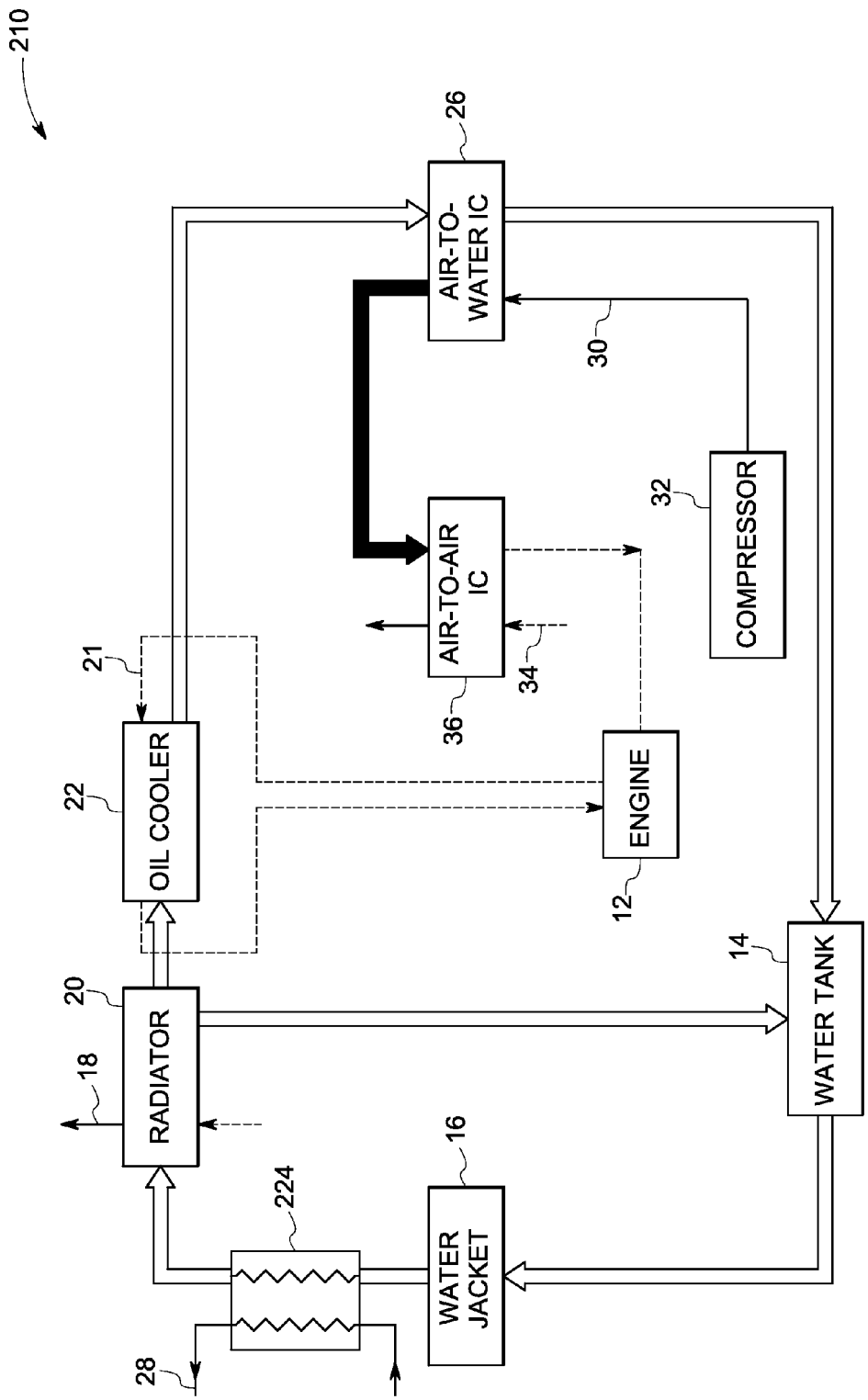
FIG. 3 is a diagrammatical representation of a heat transfer system having a heat exchanger configured for heating a viscous fuel supplied to a diesel engine in accordance with another exemplary embodiment of the invention.

Referring to FIG. 3, an engine cooling system 210 is illustrated in accordance with another exemplary embodiment of the invention. The cooling system 210 includes the water tank 14 configured to store coolant water. The water tank 14 is coupled to the water jacket 16 and configured to supply coolant water to the water jacket 16. The water jacket 16 is disposed surrounding the engine 12. The hot water from the water jacket 16 is circulated in a heat exchanging relationship with the viscous fuel 28 through a heat exchanger 224. The hot water passing through the heat exchanger 224 is used to heat the viscous fuel 28 being supplied to the engine 12 so as to reduce the viscosity of fuel 28 supplied to the engine 12. The water exiting the heat exchanger 224 is then fed to the radiator 20. The use of existing onboard fluid, i.e., hot water exiting the water jacket 16, for heating the viscous fuel would eliminate the need of separate heater and also enhance specific fuel consumption benefit. The water exiting the heat exchanger 224 is then passed in a heat exchanging relation with cool air 18 through the radiator 20. The remaining cycle of the engine cooling system is similar to the system disclosed in previous embodiments.

Figure 4:
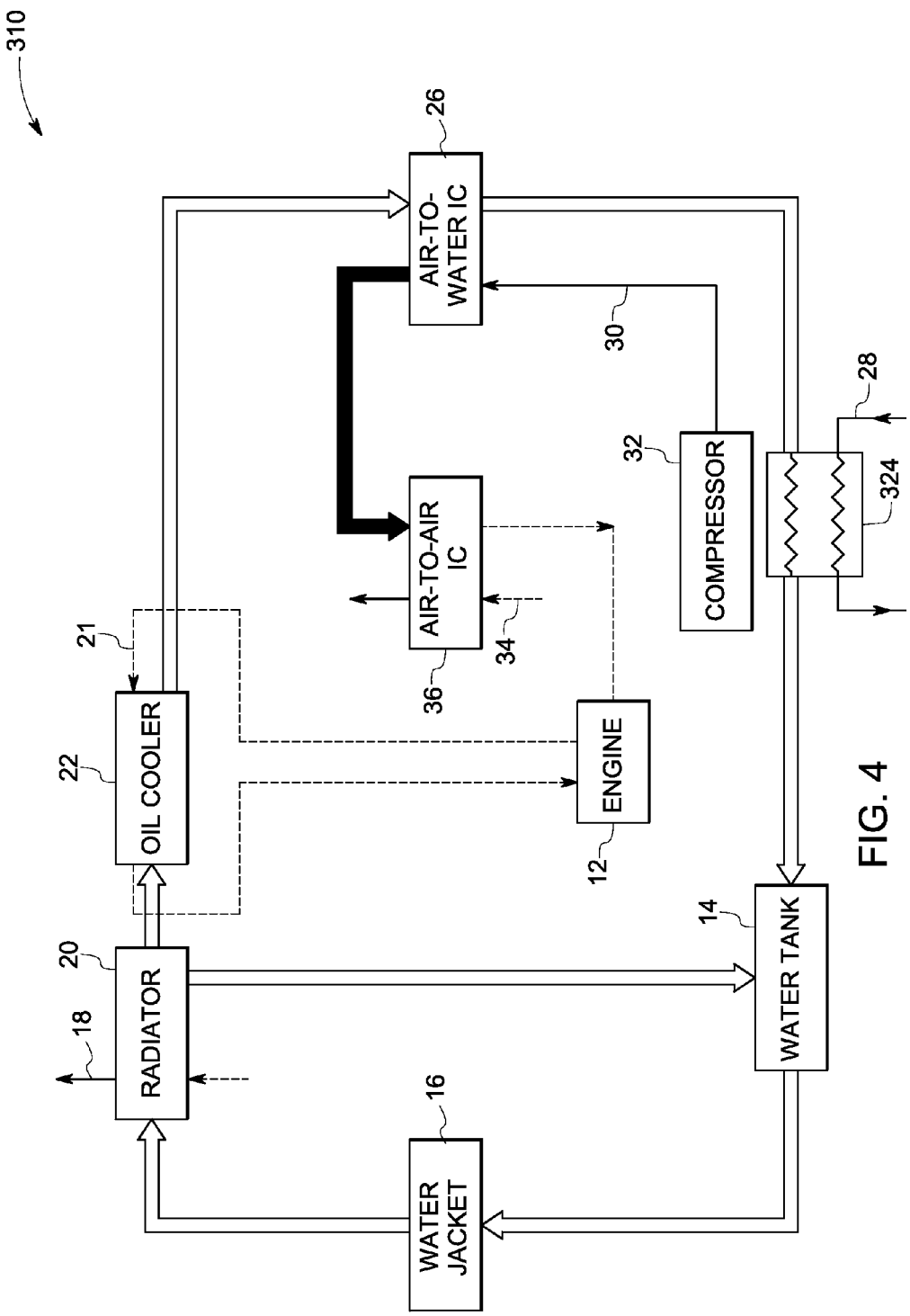
FIG. 4 is a diagrammatical representation of a heat transfer system having a heat exchanger configured for heating a viscous fuel supplied to a diesel engine in accordance with another exemplary embodiment of the invention.

Referring to FIG. 4, an engine cooling system 310 is illustrated in accordance with another exemplary embodiment of the invention. The system 310 includes the water tank 14 coupled to a water jacket 16 to supply coolant water to the water jacket 16. The heated water from the water jacket 16 is then circulated in a heat exchanging relationship with cool air 18 through the radiator 20. The heat from the water is transferred to the cool air. The water from the radiator 20 is circulated in heat exchanging relationship with hot oil 21 through the oil cooler 22. The cooled oil from the oil cooler 22 is supplied to the engine 12.

The water exiting the oil cooler 22 is then passed in a heat exchanging relation with compressed air 30 through the air to-water intercooler 26. The water passing through the air to-water intercooler 26 is heated by the compressed air 30 and is then fed to a heat exchanger 324. The hot water is circulated in heat exchanging relationship with the viscous fuel 28 through the heat exchanger 324. The hot water passing through the heat exchanger 324 is used to heat the viscous fuel 28 being supplied to the engine 12 to reduce the viscosity of fuel supplied to the engine 12. The use of existing onboard fluid, i.e., hot water exiting the air-to-water intercooler 26, for heating the viscous fuel would eliminate the need of separate heater and also enhance specific fuel consumption benefit.

The air exiting the heat exchanger 324 is then fed to the water tank 14. The remaining cycle of the engine cooling system is similar to the system disclosed in previous embodiments.

Figure 5:
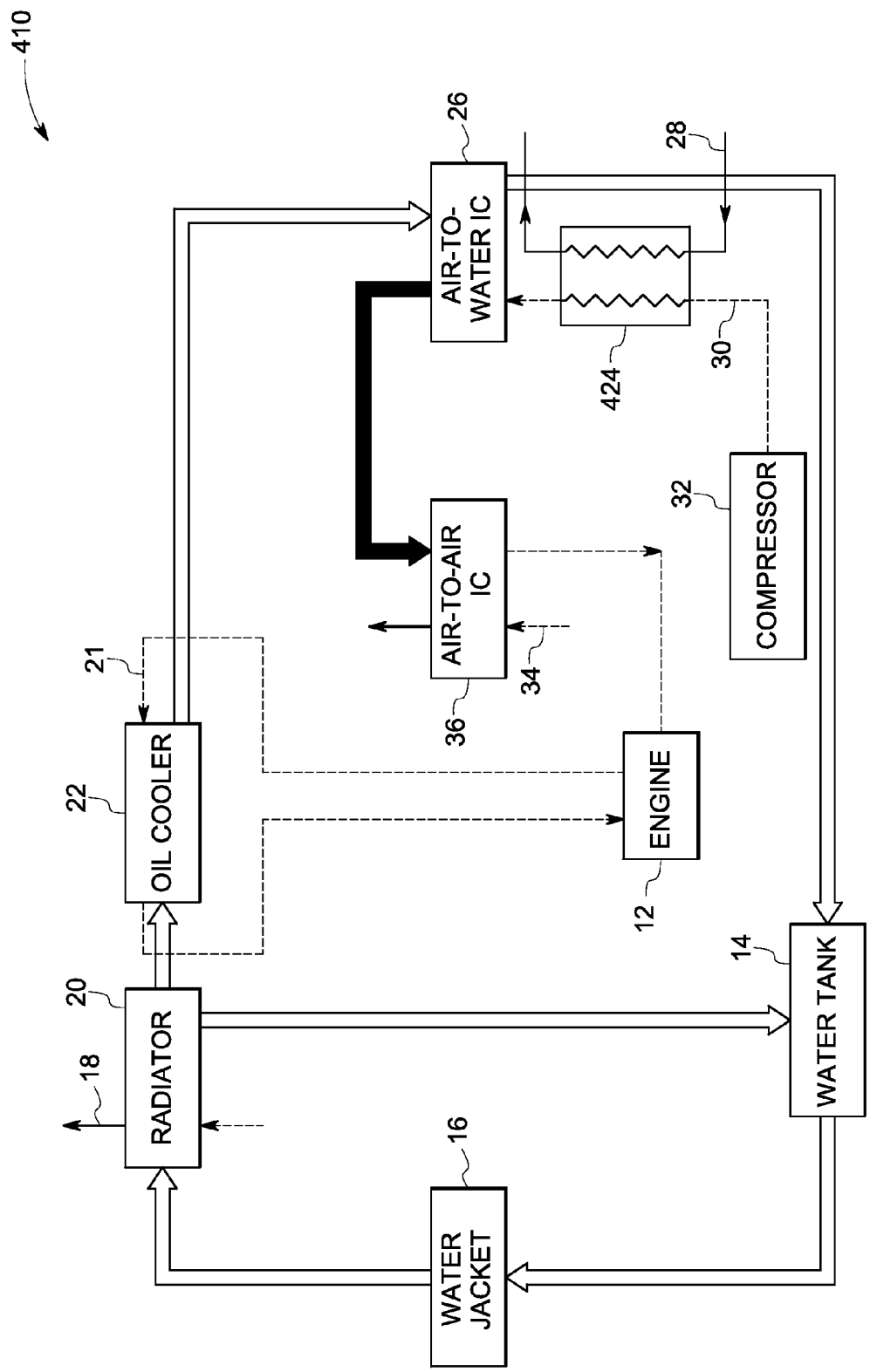
FIG. 5 is a diagrammatical representation of a heat transfer system having a heat exchanger configured for heating a viscous fuel supplied to a diesel engine in accordance with another exemplary embodiment of the invention.

Referring to FIG. 5, an engine cooling system 410 is illustrated in accordance with another exemplary embodiment of the invention. In the illustrated embodiment, the heated water from the water jacket 16 is circulated in a heat exchanging relationship with cool air 18 through the radiator 20. The heat from the water is transferred to the cool air. The water from the radiator 20 is circulated in a heat exchanging relationship with hot oil 21 through the oil cooler 22. The cooled oil from the oil cooler 22 is supplied to the engine 12.

The water exiting the oil cooler 22 is then passed in heat exchanging relation with compressed air 30 through the air-to-water intercooler 26. The compressor 32 generates the compressed air 30. In the illustrated embodiment, the compressor 32 is coupled to the air-to-water intercooler 26 via a heat exchanger 424. The water passing through the air to-water intercooler 26 is heated by the compressed air 30 and is then fed to the water tank 14. The hot air from the compressor 32 is circulated in a heat exchanging relationship with the viscous fuel 28 through the heat exchanger 424. The hot compressed air passing through the heat exchanger 424 is used to heat the viscous fuel 28 being supplied to the engine 12 to reduce the viscosity of fuel supplied to the engine 12. The air exiting the heat exchanger 424 is then fed to the air-to-water intercooler 26. The water passing through the air to-water intercooler 26 is heated by the compressed air 30 and is then fed to the water tank 14. The air exiting the air to-water intercooler 26 is then passed in a heat exchanging relation ship with cool air 34 through an air-to-air intercooler 36. Air from the air-to-air intercooler 36 is fed to the engine 12.

Figure 6:
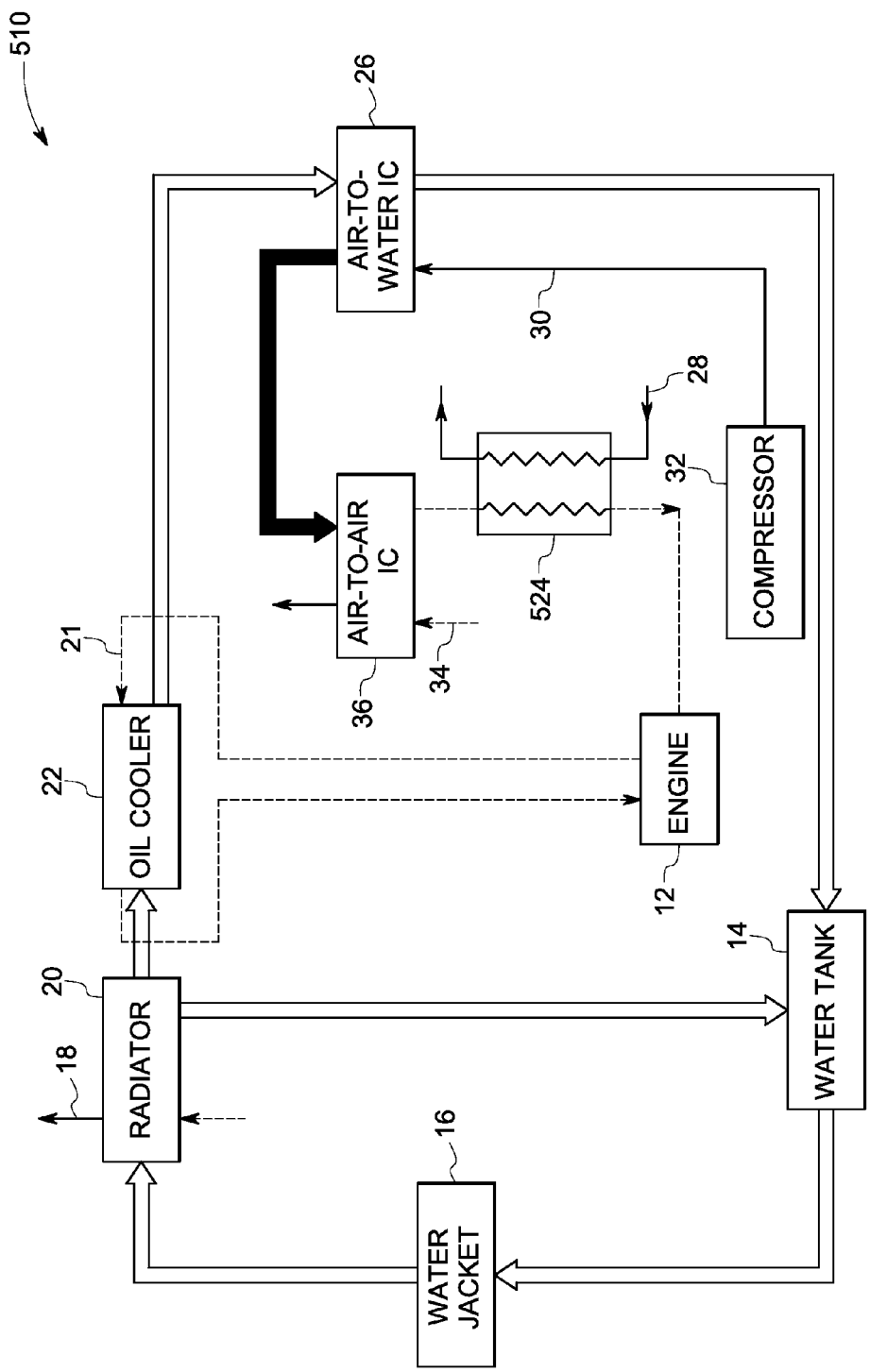
FIG. 6 is a diagrammatical representation of a heat transfer system having a heat exchanger configured for heating a viscous fuel supplied to a diesel engine in accordance with another exemplary embodiment of the invention.

Referring to FIG. 6, an engine cooling system 510 is illustrated in accordance with another exemplary embodiment of the invention. In the illustrated embodiment, the water from the radiator 20 is circulated in a heat exchanging relationship with hot oil 21 through the oil cooler 22. The water exiting the oil cooler 22 is then passed in a heat exchanging relation with compressed air 30 through the air-to-water intercooler 26. The water passing through the air to-water intercooler 26 is heated by the compressed air 30 and is then fed to the water tank 14. The air exiting the air-to-water intercooler 26 is then passed in a heat exchanging relation ship with cool air 34 through an air-to-air intercooler 36. The air-to-air intercooler 36 is coupled to the inlet of the engine 12 via a heat exchanger 524. The hot air passing through the heat exchanger 524 is used to heat the viscous fuel 28 being supplied to the engine 12 so as to reduce the viscosity of fuel supplied to the engine 12. The air exiting the heat exchanger 524 is then fed to the engine 12. The exemplary embodiments discussed above, for example embodiments described with reference to FIGS. 5 and 6 facilitates to decrease manifold air temperature of the engine, resulting in lower emissions of oxides of nitrogen. As a result, engine efficiency is further enhanced.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A heat transfer system for transferring heat to a viscous fuel supplied to a diesel engine, the heat transfer system comprising:
   a heat exchanger coupled to an air-to-water intercooler;
   a hot fluid circulated through the heat exchanger; and
   a viscous fuel circulated through the heat exchanger to the diesel engine;
   wherein the hot fluid and the viscous fuel are circulated in a heat exchanging relationship within the heat exchanger to heat the viscous fuel supplied to the engine from a first temperature to a second temperature.

2. The heat transfer system of claim 1, wherein the hot fluid and the viscous fuel are circulated in a heat exchanging relationship through the heat exchanger to the oil cooler; wherein the hot fluid comprises lubricating oil.

3. The heat transfer system of claim 1, wherein the heat exchanger is coupled to a water jacket.

4. The heat transfer system of claim 3, wherein the heat exchanger is coupled to a radiator.

5. The heat transfer system of claim 3, wherein the hot fluid exiting from the water jacket and the viscous fuel are circulated in a heat exchanging relationship through the heat exchanger; wherein the hot fluid comprises hot water.

6. The heat transfer system of claim 1, wherein the heat exchanger is coupled to an outlet of a compressor coupled to the engine.

7. The heat transfer system of claim 6, wherein the hot fluid exiting from the outlet of the compressor and the viscous fuel are circulated in a heat exchanging relationship through the heat exchanger; wherein the hot fluid comprises hot air.

8. The heat transfer system of claim 1, wherein the heat exchanger is coupled to an air-to-air intercooler.

9. The heat transfer system of claim 8, wherein the hot fluid exiting from the air-to-air intercooler and the viscous fuel are circulated in a heat exchanging relationship through the heat exchanger; wherein the hot fluid comprises hot air.

10. The heat transfer system of claim 1, wherein the heat exchanger is coupled to a water tank.

11. The heat transfer system of claim 10, wherein the hot fluid entering the water tank and the viscous fuel are circulated in a heat exchanging relationship through the heat exchanger; wherein the hot fluid comprises hot water.

12. The heat transfer system of claim 1, wherein the viscous fuel comprises palm oil.

13. The heat transfer system of claim 1, wherein the viscous fuel comprises marine diesel oil.

14. The heat transfer system of claim 1, wherein the hot liquid and the viscous fuel are circulated in a heat exchanging relationship through the heat exchanger to the oil cooler; wherein the hot liquid comprises lubricating oil.

15. The heat transfer system of claim 1, wherein the heat exchanger is coupled to a water jacket.

16. The heat transfer system of claim 15, wherein the hot liquid exiting from the water jacket and the viscous fuel are circulated in a heat exchanging relationship through the heat exchanger; wherein the hot liquid comprises hot water.

17. The heat transfer system of claim 1, wherein the heat exchanger is coupled to a water tank.

18. The heat transfer system of claim 17, wherein the hot liquid entering the water tank and the viscous fuel are circulated in a heat exchanging relationship through the heat exchanger; wherein the hot liquid comprises hot water.

19. A method for heating a viscous fuel supplied to a diesel engine, the method comprising:

circulating a hot fluid through a heat exchanger coupled to an air-to-water intercooler;

circulating a viscous fuel through the heat exchanger to the diesel engine;

wherein the hot fluid and the viscous fuel are circulated in a heat exchanging relationship within the heat exchanger to heat the viscous fuel supplied to the engine from a first temperature to a second temperature.

20. The method of claim 19, comprising circulating the hot fluid and the viscous fuel in a heat exchanging relationship through the heat exchanger to an oil cooler;

wherein the hot fluid comprises lubricating oil.

21. The method of claim 19, comprising circulating the hot fluid exiting from a water jacket and the viscous fuel in a heat exchanging relationship through the heat exchanger; wherein the hot fluid comprises hot water.

22. The method of claim 19, comprising circulating the hot fluid exiting from an outlet of a compressor and the viscous fuel in a heat exchanging relationship through the heat exchanger; wherein the hot fluid comprises hot air.

23. The method of claim 19, comprising circulating the hot fluid exiting from an air-to-air intercooler and the viscous fuel in a heat exchanging relationship through the heat exchanger; wherein the hot fluid comprises hot air.

24. The method of claim 19, comprising circulating the hot fluid entering the water tank and the viscous fuel in a heat exchanging relationship through the heat exchanger; wherein the hot fluid comprises hot water.

* * * * *